March 17, 1959 N. A. SCHUSTER 2,878,443
MAGNETIC RESONANCE APPARATUS
Filed Dec. 30, 1954 4 Sheets-Sheet 1

INVENTOR.
NICK A. SCHUSTER.
BY
HIS ATTORNEY.

March 17, 1959 N. A. SCHUSTER 2,878,443
MAGNETIC RESONANCE APPARATUS
Filed Dec. 30, 1954 4 Sheets-Sheet 2

INVENTOR.
NICK A. SCHUSTER.
BY
HIS ATTORNEY.

FIG. 4

INVENTOR.
NICK A. SCHUSTER.
BY
HIS ATTORNEY.

March 17, 1959 N. A. SCHUSTER 2,878,443
MAGNETIC RESONANCE APPARATUS
Filed Dec. 30, 1954 4 Sheets-Sheet 4

INVENTOR.
NICK A. SCHUSTER.
BY
HIS ATTORNEY.

United States Patent Office

2,878,443
Patented Mar. 17, 1959

2,878,443

MAGNETIC RESONANCE APPARATUS

Nick A. Schuster, Ridgefield, Conn., assignor, by mesne assignments, to Schlumberger Well Surveying Corporation, Houston, Tex., a corporation of Texas Application December 30, 1954, Serial No. 478,860

9 Claims. (Cl. 324—.5)

The present invention relates to magnetic resonance apparatus, and more particularly to new and improved apparatus for increasing substantially the observable signal in magnetic resonance techniques and which may be particularly useful, for example, in the non-destructive chemical analysis of materials.

Nuclear and other paramagnetic resonances have been observed in the past, as disclosed, for example, in Patent No. 2,561,489, issued July 24, 1951, to Bloch and Hansen. In general, a sample exhibiting paramagnetic properties is placed in a constant magnetic field that is substantially homogeneous within the sample. A radio-frequency activated coil at right angles to the constant magnetic field generates an alternating magnetic field in the sample. The frequency of the alternating magnetic field is selected equal to the resonance precession frequency of the paramagnetic particles in the constant field. The resonance may be observed, for example, in one of the following ways: (1) as a result of the absorption or dispersion of the alternating magnetic field; (2) as a result of the voltage at the precession frequency induced in a coil at right angles to both the constant magnetic field and the axis of the alternating field inducing coil; or (3) by modulating either or both of the magnetic fields, and detecting the effects of the modulation in accordance with either of the first two methods above.

Such methods have been successful in the carefully controlled conditions of a laboratory, particularly where the sample under investigation is in fluid form, since both the constant and the alternating magnetic fields may be made almost completely homogeneous within the sample, and the frequency of the alternating field may be maintained at the resonance precession frequency. Prior to the application of the alternating magnetic field, the individual macroscopic magnetic moments associated with each volume element in the paramagnetic sample under investigation are lined up with the constant magnetic field. When the alternating magnetic field is applied to the sample, each individual macroscopic moment will move relative to the constant magnetic field in a path known as a nutation. The particular path followed by each macroscopic moment is directly dependent on the intensities of the constant and the alternating magnetic fields within the particular volume element with which such moment is associated. Where the fields are completely homogeneous within the sample under investigation, all volume elements of the sample will be in magnetic fields of the same intensities. Accordingly the macroscopic moments associated with each volume element will nutate in the same path and will thus remain together as they nutate, i. e., the phase coherence of the individual macroscopic moments will be maintained. Since the magnitudes of the individual macroscopic moments are decreasing at a relatively low rate determined by the relaxation times involved, and since these moments nutate together, the total macroscopic moment remains relatively large whereby the resonance signal may be readily observed in the interval immediately after the alternating field is applied to the paramagnetic sample under investigation.

Eventually an equilibrium or steady state condition is reached when the decrease in the magnitude of the macroscopic moments as the result of relaxation is equal to the increase in the magnitude of the moments as a result of the action of the constant magnetic field. At this time the nutation becomes a secondary effect, and the individual macroscopic moments will precess in the constant field at resonance precession frequency determined by the intensity of the constant magnetic field and at an angle with respect to the direction of the constant field dependent on the intensity of the alternating field. Again where the fields are substantially homogeneous, these moments will precess together, i. e., the phase coherence of the individual macroscopic moments will be maintained, and thus the total macroscopic moment, though decreased by relaxation, may be detected in the steady state condition.

However, where the fields are not homogeneous, individual volume elements will be in fields of different intensities and the nutations of the individual macroscopic moments which are dependent on such intensities will be at different angular velocities and in different directions. It can be seen that the individual macroscopic moments will not remain lined up with each other, but to the contrary, will become further and further divergent with continued application of the alternating magnetic field. The rate of divergence is a function of the degree of field inhomogeneities. This "disorder" effect, i. e., the cumulative loss of phase coherence of the individual macroscopic moments very quickly attenuates the total macroscopic moment associated with all volume elements in the material under observation, whereby the detectable signal is quickly decreased by the disorder and may be detected only during a very brief interval following the application of the alternating field. Obviously, by the time the steady state condition is reached, there is no resonance signal capable of observation where substantial field inhomogeneities exist. When the resonance signal has become attenuated to a substantial degree, the alternating field must be removed for a relatively long period to permit "repair" of the moments in the constant field before the alternating field can be reapplied in order to detect resonance in the short interval immediately thereafter. Since the signal can be detected only for relatively short periods in any given cycle, the signal-to-noise ratio is extremely low, and where substantial field inhomogeneities are encountered, this ratio may actually be less than one.

Accordingly, it is a primary object of the present invention to provide new and improved apparatus for observing paramagnetic resonance phenomena, that are useful, for example, in non-destructive chemical analyses.

Another object of the invention is to provide paramagnetic resonance detecting apparatus in which the required degree of frequency stability and of magnetic field homogeneity is less critical.

A further object of the invention is to provide paramagnetic resonance detecting apparatus giving increased signal-to-noise ratio, whereby the signal resulting from precession is more readily and accurately observed.

These and other objects of the invention are attained by applying a first alternating magnetic field substantially perpendicularly to a constant magnetic field within a sample containing paramagnetic particles. The frequency of the first alternating magnetic field is selected substantially equal to the resonance precession frequency of the paramagnetic particles in the constant field, and consequently the first alternating field has a component effectively rotating in the plane perpendicular to the constant field at substantially the resonance frequency. After a relatively short time interval, the first alternating field is removed and substantially simultaneously a second alternating field is applied substantially perpendicularly to the constant field and of such phase that at the instant of application of the second field its component rotating in the same direction as the said rotating component of the first alternating field is substantially perpendicular thereto. The second alternating magnetic field will maintain the macroscopic magnetic moments associated with the sample under observation substantially aligned with its effective rotating component, whereby phase coherence of the moments is substantially maintained, and a relatively large resonance signal may be detected during the application of said second field, at the frequency thereof.

In one embodiment the first alternating field is applied for a first interval sufficient to nutate the macroscopic moments to a position substantially perpendicular to the constant field, and the second alternating field, applied at the end of the first interval, has the same frequency as the first alternating field.

In a second embodiment, the first alternating field is also applied for a first interval sufficient to nutate the macroscopic moments to a position substantially perpendicular to the constant field, but the frequency of the second alternating field is substantially different from the frequency of the first field.

In a third embodiment in which the resonance is detected in the steady state condition, the first alternating field is applied for a first interval sufficient to nutate the moments through the angle they would assume in the steady state considering the intensities of the constant magnetic field and second alternating magnetic field. The second alternating field is then applied at a frequency substantially different from the frequency of said first field.

The invention will be more fully understood with reference to the accompanying drawings, in which.

Figure 1A:
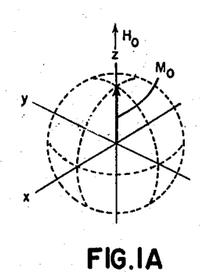
Fig. 1 is a series of vector diagrams employed to explain some of the principles of paramagnetic resonance as well as the principles of operation of the apparatus shown in Fig. 2.
Figure 1B:
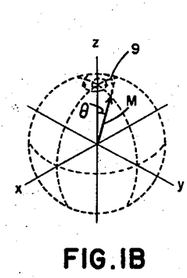

My copending applications Serial No. 463,776, filed October 21, 1954, for "Magnetic Resonance Methods and Apparatus," and Serial No. 473,112, filed December 6, 1954, for "Magnetic Resonance Methods and Apparatus" contain discloseres of other highly effective methods and apparatus for correcting disorder effects in magnetic resonance techniques, as well as explanations of some of the principles of magnetic resonance phenomena. However, in order to re-acquaint the reader with some of the general principles of magnetic resonance phenomina, reference may be had to Figs. 1A–1E, hereof. In the three-dimensional diagram shown in Fig. 1A, particles exhibiting paramagnetic properties are at the junction of the respectively perpendicular $x$, $y$ and $z$ axes, and a constant magnetic field of intensity $H_0$ is applied along the $z$ axis to these paramagnetic particles. After a period of time sufficient for thermal equilibrium to be reached, the total macroscopic magnetic moment associated with the particles in the field $H_0$ is lined up with the constant field $H_0$ along the $z$ axis and has a magnitude $M_0$. If now an R. F. coil having its longitudinal axis coincident with the $x$ axis is activated with an R. F. signal of frequency equal to the resonance precession frequency $f_0$, where $$f_0 = \gamma H_0 / 2\pi \tag{1}$$

and $\gamma$ is a constant (the gyromagnetic ratio) for the particular particles under observation, an alternating magnetic field of intensity $2H_1$ is generated which has one component of intensity $H_1$ effectively rotating about the $z$ axis in the $x$, $y$ plane clockwise at the frequency $f_0$. The other component of the alternating field is rotating counterclockwise and may be disregarded, as is well known. The total macroscopic moment having an instantaneous magnitude $M$ will then precess about the $z$ axis in a spiral path 9 and nutate through an angle $\theta$, as shown in Fig. 1B. The instantaneous magnitude $M$ is less than $M_0$ and is decreasing towards lower values at a rate determined by the relaxation times $T_1$ and $T_2$ associated with the resonance, as is well known.

Figure 1C:
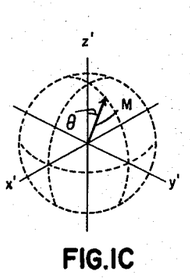

The nutation will be more readily visualized if we place ourselves in a frame of reference $x'y'z'$ having the respectively perpendicular $x'$ and $y'$ axes rotating clockwise about the $z'$ axis at the frequency $f_0$. In this frame, the nutation of macroscopic moment $M$ will appear to be a pure rotation through the angle $\theta$ in the plane $y'z'$ as shown in Fig. 1C which is rotating at frequency $f_0$. At any given instant the angle $\theta$ is given by $$\theta = \gamma H_1 t \tag{2}$$

where $H_1$ is the intensity of the component of the alternating magnetic field rotating clockwise at the frequency $f_0$, and $t$ is the time elapsed since the application of the alternating field. As mentioned above, the actual applied intensity of the alternating field is $2H_1$. Hereinafter only the effective intensities ($H_1$, for example) of alternating fields will be referred to, it being understood that the actual applied intensities must be twice these values.

Figure 1D:
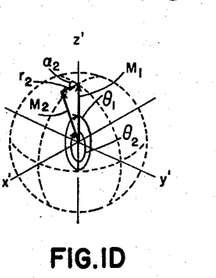
Figure 1E:
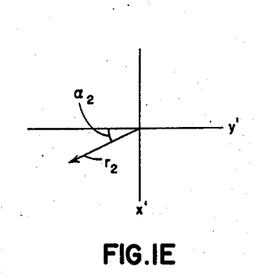

This explanation is satisfactory where the fields are perfectly homogeneous or nearly so. Let us consider the effect of field inhomogeneities. Individual macroscopic moments associated with volume elements not in fields of the intensities $H_1$ or $H_0$, will not nutate through the angle $\theta$, nor will they remain in the plane $y'z'$ rotating at frequency $f_0$, as can be seen from Relations 2 and 1 respectively. For example, as shown in Fig. 1D, when the macroscopic moments $M_1$ of volume elements actually in fields of intensity $H_1$ and $H_0$ have nutated 360° back to the $z'$ axis after a period of time determined in accordance with Relation 2 above ($\theta = 2\pi$), a representative individual macroscopic moment $M_2$ of a volume element in fields other than $H_1$ and $H_0$ will not be lined up with the $z'$ axis nor will it be in the $y'z'$ plane. As shown in Fig. 1E, in the $x'y'$ plane, moment $M_2$ will have a component of amplitude $r_2$ making an angle $\alpha_2$ with the negative $y'$ axis. Other individual macroscopic moments $M_3$, $M_4$, etc., (not shown) in fields respectively different from $H_1$ and $H_0$ and from each other will have different components $r_3$, $r_4$, etc., in the $x'y'$ plane, making different angles $\alpha_3$, $\alpha_4$, etc., with the negative $y'$ axis. After one 360° nutation, the $r$ components will be relatively small but the angles $\alpha$ may be in the full range from 0° to 360°. However, with continued application of the R. F. field $H_1$, these moments will continue to fan out, e. g., $\alpha$ will vary and $r$ will increase, until the individual macroscopic moments are randomly distributed about the sphere, thus completely destroying the total macroscopic moment, i. e., the vector sum of the individual macroscopic moments, whereby the detectable resonance precession signal is destroyed. In accordance with the present invention, this cumulative fanning out is substantially prohibited.

Figure 2:
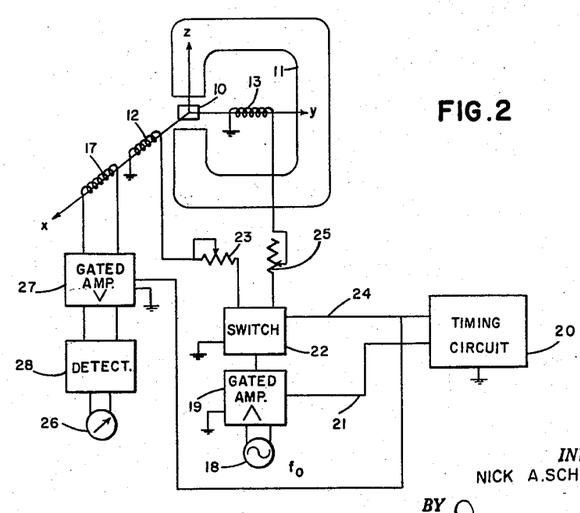
Fig. 2 shows apparatus constructed to operate in accordance with the present invention.

One embodiment of the present invention may be explained with reference to the apparatus shown schematically in Fig. 2. In Fig. 2 a sample 10 containing paramagnetic particles having a gyromagnetic ratio $\gamma$ is placed between the pole faces of a magnet 11 generating a substantially constant magnetic field along the z axis, and having an average intensity $H_0$ throughout sample 10. After the macroscopic magnetic moment $M_0$ associated with paramagnetic sample 10 has become aligned with the constant field along the z axis, a coil 12 is activated with alternating current of frequency $f_0$ determined in accordance with Relation 1 above. Coil 12, having its longitudinal axis along the x axis perpendicular to the z axis through sample 10, generates an alternating magnetic field of average intensity $2H_1$ in sample 10. The significant component of average intensity $H_1$ of this alternating field rotates clockwise in the xy plane at an angular frequency $\omega_0$ (where $\omega_0 = 2\pi f_0$). The field $H_1$ is applied for a period $t_1$ such that $\theta$ in Relation 2 above substantially equals $\pi/2$, i. e., a 90° nutation. As a result of field inhomogeneities, individual macroscopic moments associated with volume elements not in fields of intensity $H_0$ and $H_1$ will not in fact nutate precisely 90° in the rotating plane $z'y'$, but within interval $t_1$ which is extremely short, the moments will be so nearly aligned with the $y'$ axis that only the total macroscopic moment M, nutated to a position along the $y'$ axis need be considered at the end of period $t_1$.

At the end of interval $t_1$, the field $H_1$ is removed, and a coil 13 aligned with the y axis is activated with current of the same frequency and phase as coil 12, thus generating a field of intensity $2H_2$ having an effective component $H_2$ rotating at the angular frequency $\omega_0$ in the same direction in which field $H_1$ rotated during interval $t_1$. However, even though the phases of the currents generating $H_1$ and $H_2$ are the same, due to the fact that coil 13 is displaced 90° with respect to coil 13, the rotating field $H_2$ will be parallel to the rotating $y'$ axis and to the moment M, whereas field $H_1$ was perpendicular thereto.

Individual macroscopic moments which are associated with volume elements actually in the field of intensity $H_0$ and thus have a resonant frequency equal to $f_0$ will remain lined up with the $y'$ axis. Accordingly, field $H_2$ which is parallel to the $y'$ axis will exert no force on these moments. However, macroscopic moments which are associated with volume elements in fields other than intensity $H_0$ will have resonant precession frequencies different from $f_0$ and will thus rotate faster or slower than the $y'$ axis and will tend to move out of alignment therewith. As soon as such moments are out of line with the $y'$ axis, the field $H_2$ will exert a force thereon. This force is such as to keep such moments "focused" in the vicinity of the $y'$ axis, whereby phase coherence of all the moments is substantially maintained.

Figure 1F:
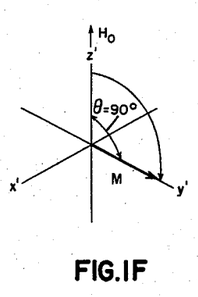
Figure 1G:
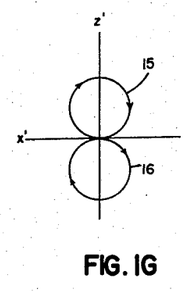

For the purposes of explanation, consider an individual macroscopic moment M at time $t_1$ when said moment has been aligned with the $y'$ axis, as shown in Fig. 1F, or in Fig. 1G where the $y'$ axis is out of the paper. At any time $t$ during the application of field $H_2$ after the interval $t_1$, the respective $x'$, $y'$ and $z'$ components, $M_x$, $M_y$ and $M_z$, of this moment M are given approximately by $$M_x = \frac{\delta \sin at}{(1+\delta^2)^{1/2}} M \quad (3)$$

$$M_y = \frac{1+\delta^2 \cos at}{1+\delta^2} M \quad (4)$$

$$M_z = \frac{\delta}{1+\delta^2}(1-\cos at)M \quad (5)$$

where $$\delta = \frac{\omega_a - \omega_b}{\gamma H_2} \quad (6)$$

$$a = \gamma H_2 (1+\delta^2)^{1/2} \quad (7)$$

and $\omega_a$ is the angular frequency of the field $H_2$ and $\omega_b$ is the angular resonance precession frequency of the particles in the volume element with which the particular moment M is associated. In this embodiment, therefore, $\omega_a = \omega_0$. Relations 3, 4 and 5 are good approximations for times $t_1 + t$ small compared to the relaxation times $T_1$ and $T_2$ associated with the resonance, where, as is well-known, $T_1$ is the relaxation time parallel to the applied field, and $T_2$ is the relaxation time perpendicular to the applied field in the absence of field inhomogeneities. If $H_2$ is made sufficiently large so that $\delta$ is somewhat smaller than unity, these relations can be approximated as follows:

$$M_x = (\delta \sin at)M \quad (8)$$

$$M_y = (1+\delta^2 \cos at)M \quad (9)$$

$$M_z = \delta(1-\cos at)M \quad (10)$$

Relations 8 and 10, respectively, for the $x'$ and $z'$ components M, describe a circle in the $x'z'$ plane shown in Fig. 1G. For a value of $\delta$ that is positive (i. e. $\omega_0 > \omega_b$) Relations 6 and 8 describe a circle 15 above the $x'$ axis, while for a value of $\delta$ that is negative ($\omega_b > \omega_0$), Relations 6 and 8 describe a circle 16 below the $x'$ axis. Thus the application of the field $H_2$ parallel to $y'$ at frequency $\omega_0$, prevents any macroscopic moment from fanning out from the $y'$ axis to any considerable extent even where said moment results from a volume element in a field different from $H_0$ due to inhomogeneities, and thus has a resonant frequency $\omega_b$ different from $\omega_0$. Accordingly, the application of the field $H_2$ prevents all macroscopic moments from fanning out as a result of field inhomogeneities and focuses all the magnetic moment vectors from various volume elements into the figure eight pattern of Fig. 1G.

In practice $H_2$ must be greater than $\Delta H_0/2$, where $\Delta H_0$ is the half-width of the inhomogeneity in field $H_0$ within sample 10, and the focusing improves as $H_2$ is made increasingly greater than $\Delta H_0/2$, but $H_2$ need not be greater than $5\Delta H_0$ for excellent focusing.

As an example assume the maximum value of $\delta$ through the sample is 0.2, the $M_y$ component of the macroscopic moment M corresponding to $\delta = 0.2$ stays between the magnitude M and approximately 0.92M, while the $M_x$ component is always less than 0.2M and the $M_z$ component is always less than 0.4 M. Thus, if a detector coil 17 is placed along the x axis in Fig. 2, a signal proportional to about 0.96M will be induced therein, whereas if $H_2$ had not been applied, the total moment would have decayed very rapidly as a result of the rapid loss of phase coherence in the individual macroscopic moments which the focusing substantially prevents. It should be noted, however, that due to relaxation the magnitude of moment M is slowly decreasing, and accordingly within a period short with respect to the relaxation times, say $\frac{1}{2}T_2$, the $H_2$ field should be removed, and the moment M allowed to re-approach the value $M_0$ along the axis whereupon the $H_1$ and $H_2$ fields may be successively reapplied and the cycle repeated.

Figure 3:
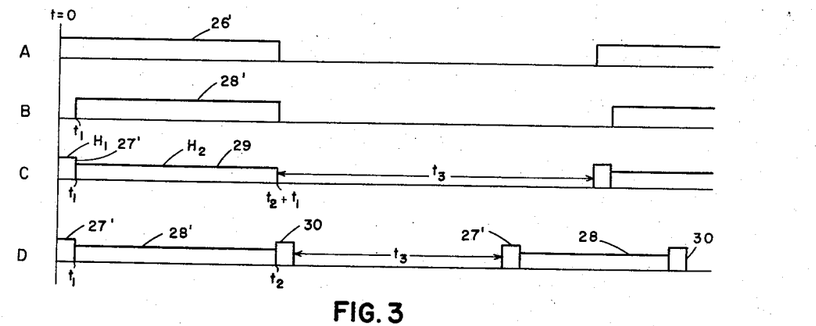
Fig. 3 is a series of pulse diagrams to explain the operation of the apparatus shown in Fig. 2.

To appreciate the time cycle the remaining apparatus shown schematically in Fig. 2 may be referred to in conjunction with the pulse diagram shown in Fig. 3. An oscillator 18 generating R. F. of frequency $f_0$ is connected to an amplifier 19 adapted to be gated by pulses received from timing circuit 20 via conductor 21. The output of amplifier 19 is normally connected through a switch to coil 12 via current control element 23. However, when switch 22 is activated by pulses from timing circuit 20 via conductor 24, the output of amplifier 19 is disconnected from coil 12 and applied via current control element 25 to coil 13. Current control elements 23 and 25 are adjusted to give the desired intensity fields $H_1$ and $H_2$ in sample 10 from coils 12 and 13, respectively. The output of detecting coil 17 is connected to meter 26 via amplifier 27 and detector 28.

In operation, assume that it is desired to detect proton resonance in sample 10, where $\gamma = 2.67 \times 10^4$ and $T_1 \cong T_2 \cong 1$ sec. If $H_0 = 250$ gauss, $f_0 = 1.06$ mc., and if $\Delta H_0 = 2.5$ gauss, $H_2$ may equal 5 gauss ($2\Delta H_0$), and $H_1$ may be set equal to 10 gauss. At time $t = 0$ when the macroscopic moments in sample 10 are aligned with the $z$ axis, a gate pulse 26', Fig. 3A, is applied to amplifier 19, and coil 12 is activated at frequency $f_0$, thus producing the field $H_1$, the envelope 27' of which is shown in Fig. 3C. At time $t_1 = 5.9$ µ sec., computed in accordance with Relation 2 above to produce a 90° ($\theta = \pi/2$) nutation, switch 22 is activated by pulse 23', Fig. 3B, and thus the coil 12 deactivated and coil 13 activated to produce the field $H_2$, the envelope 29 of which is shown in Fig. 3C. Simultaneously pulse 28' opens amplifier 27 and the resonance signal is detected at frequency $f_0$ by detectors 28 and 26. After the field $H_2$ has been applied for a time $t_2$ less than the relaxation time $T_2$, say ¼ sec., the entire system is turned off for an interval $t_3$ equal to say ¼ sec. and the process repeated.

The interval $t_3$ may be shortened considerably if at the end of interval $t_2$ the moments are counter-nutated back to the $z$ axis by means of 90° nutating pulse 30 (Fig. 3D) generated by current through coil 12 of phase opposite to the phase of the current generating field $H_1$ during pulse 27, as disclosed in my aforementioned co-pending application Serial No. 463,776. In addition the field $H_2$ applied during period $t_2$ may be applied in the form of successive pulses during which the field $H_2$ is alternately oppositely phases, in accordance with said application, to assist in the detection of the resonance signal, and to further maintain phase coherence with inhomogeneities in field $H_2$. While in Fig. 2, field $H_2$ is shown applied by a coil 13 at right angles to the $H_1$-producing coil 12, it will be understood that the same coil 12 may be used to produce both fields $H_1$ and $H_2$ by making the current through coil 12, producing field $H_2$, 90° out of phase with the current through coil 12 which produced field $H_1$, whereby field $H_2$ is 90° out of phase with $H_1$. In addition, while the current in coil 13 is shown as being in phase with the current that passed through coil 12, it will be understood that these currents may be 180° out of phase.

While the induction method of detection is shown, it will be understood that the resonance may be detected by dispersion. Further, it can be seen from Relations 4 and 9 above that the resonance signal in coil 17 is modulated as to amplitude and phase, and these modulations may be employed to assist in distinguishing the resonance signal from any signal resulting from direct coupling between coils 13 and 17. Obviously, when coil 13 is employed to generate field $H_2$, coil 12 may be used to detect resonance in lieu of an additional coil 17.

Figure 4:
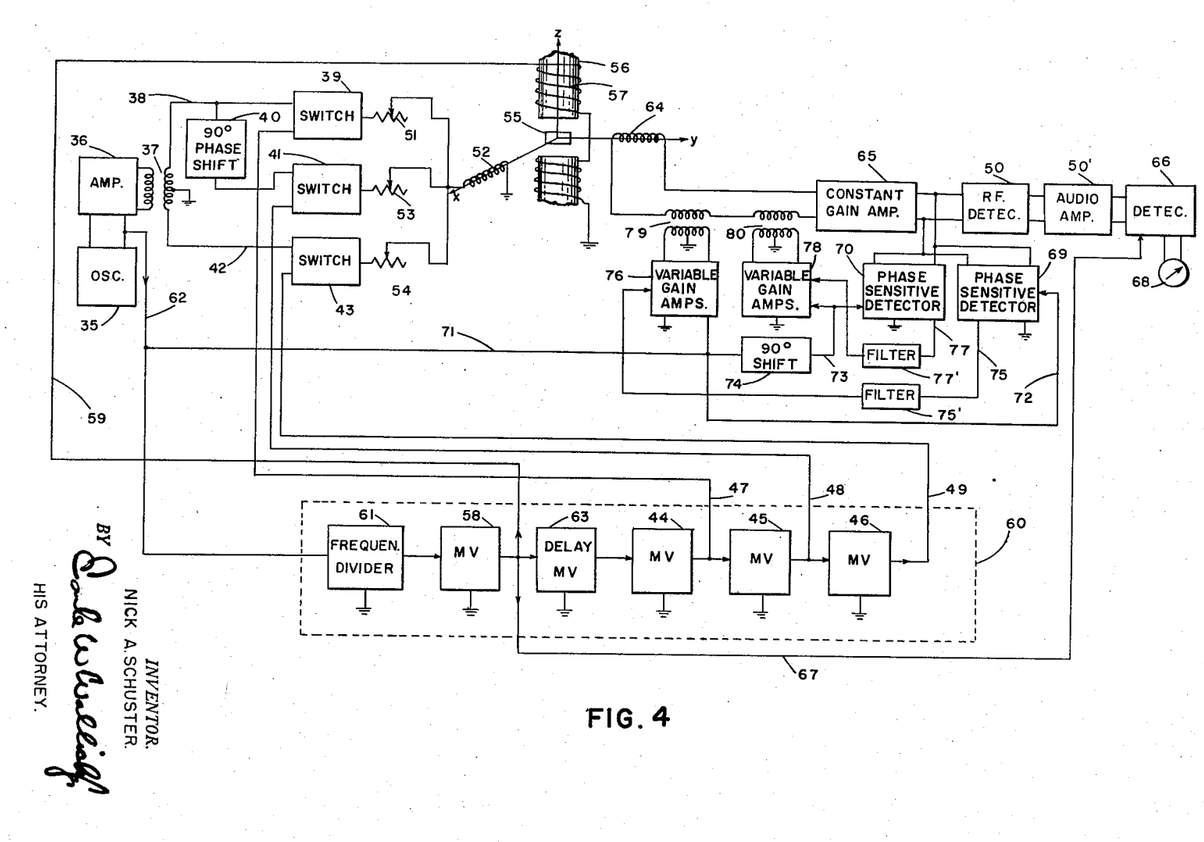
Fig. 4 represents other apparatus constructed in accordance with the invention.

Apparatus employing several of the aforementioned principles is disclosed in Fig. 4. In Fig. 4, the output of a crystal controlled R. F. oscillator 35 is applied to the input of a constant gain amplifier 36, the output of which is applied to a phase splitting transformer 37. R. F. current of a first phase is applied by conductor 38 to the input of normally opened switch 39, and to the input of 90° phase shifting device 40. The 90° phase shifted R. F. current from device 40 is applied to the input of normally opened switch 41. R. F. current 180° out of phase with the current in conductor 38 is applied by conductor 42 to the input of normally opened switch 43. Switches 39, 41 and 43 are adapted to be closed when proper gate pulses are received from multivibrators 44, 45 and 46, respectively, via conductors 47, 48 and 49, respectively.

When switch 39 is closed, the R. F. input thereto is adapted to be applied via current control element 51 to an R. F. coil 52. When switches 41 and 43 are closed, their R. F. outputs are adapted to be applied to coil 52 via current control elements 53 and 54, respectively. Coil 52 is oriented at substantially right angles to the magnetic field produced in a sample 55 by magnetic field generating means 56. The magnetic field produced by means 56, which may be either a permanent or an electromagnet, is adapted to be modulated by current passing through coil 57 from the output of multivibrator 58 via conductor 59.

The timing circuit 60 for the entire system comprises a frequency divider 61 coupled to the output of oscillator 35 via conductor 62, the output of which synchronizes a first multivibrator 58, which is coupled to a chain of multivibrators 58, 63, 44, 45 and 46, respectively.

Oriented substantially perpendicularly to coil 52 and the field produced by means 57 is an R. F. detecting coil 64, the output of which is applied to the input of a constant gain amplifier 65. The output of amplifier 65 is applied through R. F. detector 50 and audio amplifier 50' to a first balanced phase sensitive detector 66, receiving a sensitizing signal from multivibrator 58 via conductor 67. The output of detector 66 is applied to meter 68. In addition, the output of amplifier 65 is applied to second and third balanced phase sensitive detectors 69 and 70. Detector 69 receives a sensitizing signal directly from oscillator 35 via conductors 62, 71 and 72, while detector 70 receives a sensitizing signal from oscillator 35 via conductors 62, 71 and 73 after a phase shift of 90° provided by means 74. The output 75 of detector 69 applied through low pass filter 75' is used to control the gains of twin, push-pull variable gain amplifiers 76, while the output 77 of detector 70 controls the gain of twin push-pull variable gain amplifier 78, via low pass filter 77'. The input to amplifiers 76 comprises the R. F. signal on conductor 71 from oscillator 35, while the output thereof is applied in series with coil 64 via transformer 79. The input to amplifiers 78 comprises the 90° phase shifted R. F. signal on conductor 73, the output thereof being applied in series with coil 64 and the secondary of transformer 79 by means of transformer 80.

Figure 5:
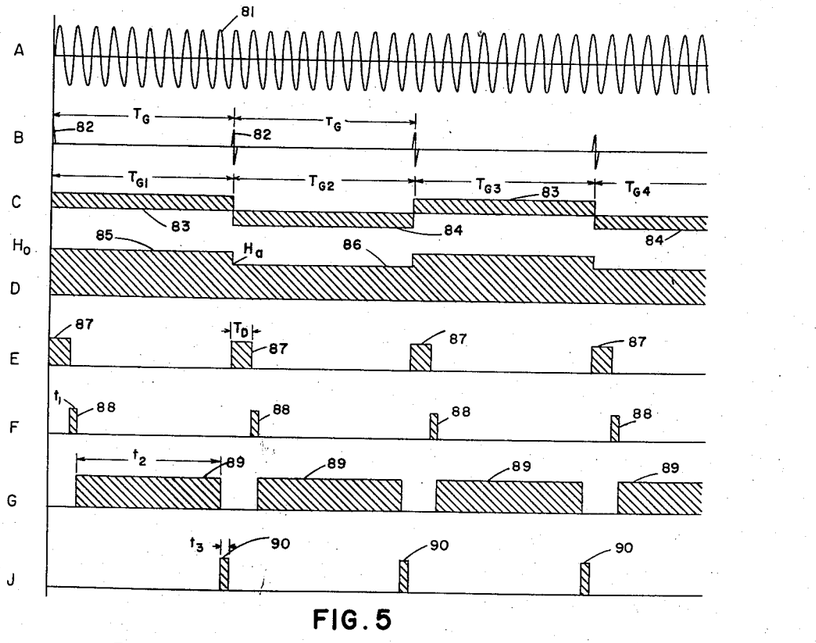
Fig. 5 is a series of pulse diagrams to explain the operation of the apparatus shown in Fig. 4.

As shown in Fig. 5, the R. F. output 81 of oscillator 35, Fig. 5A, is divided into a series of pulses 82, Fig. 5B, spaced time $T_G$ apart, by divider 61. Pulses 82 trigger multivibrator 58, which produces successive positive and negative pulses 83 and 84 respectively, of duration $T_G$. Pulses 83 and 84 are applied to coil 57 to modulate the otherwise constant magnetic field produced in sample 55 by magnet 56. Thus as shown in Fig. 5D, the magnetic field along the $z$ axis through sample 55 is modulated between upper and lower limits substantially in square wave form. The upper limit 85 of the constant field during intervals $T_{G1}$, $T_{G3}$, etc., is selected to produce a field in sample 55 of average value $H_0$, and oscillator 35 generates current of frequency $f_0$ as determined in accordance with Relation 1 above. The lower limit 86 during intervals $T_{G2}$, $T_{G4}$, etc., is selected to produce a field $H_a$ substantially different from $H_0$.

The pulses 83 and 84 in addition trigger multivibrator 63 producing delay pulses 87 of duration $T_D$ following the beginning of each pulse 83 or 84. The end of each pulse 87 triggers multivibrator 44 to produce pulses 88 of duration $t_1$. Pulses 88 close switch 39 and allow R. F. current of one phase to activate coil 52 to produce field $H_1$ in sample 55. Field $H_1$ is employed to produce a 90° nutation, $\theta = \pi/2$ in Relation 2 above, and thus $t_1 = \pi/2\gamma H_1$.

The end of each pulse 88 in addition triggers multivibrator 45 to produce pulses 89 of duration $t_2$ which is long with respect to $t_1$. Pulses 89 close switch 41 to permit R. F. current 90° out of phase with the current applied to coil 52 during interval $t_1$, to be applied to coil 52, thus producing field $H_2$ in sample 55. The trailing edge of pulse 89 triggers multivibrator 46 to produce pulses 90 of duration $t_3$, which close switch 43 and permit R. F. current, 180° out of phase with the current which produced field $H_1$ during time $t_1$, to produce field $H_3$ in coil 52 for a time $t_3$. The intensity $H_3$ and time $t_3$ are selected to produce a 90° counter nutation, and thus $t_3 = \pi/2\gamma H_3$. If the intensity $H_1 = H_3$ (though the phases are opposite), obviously $t_1$ will be selected equal to $t_3$.

In operation, again assume that it is desired to detect proton resonance in sample 55, where as above for proton resonance $\gamma = 2.67 \times 10^4$ and the relaxation times $T_1 \cong T_2 \cong 1$ sec. The magnetic field $H_0$ produced along the $z$ axis by pulse 85 in Fig. 5D may have an average value of 250 gauss within sample 55, and thus $f_0 = 1.06$ mc. from Relation 1 above. If $\Delta H_0 = 2.5$ gauss, then $H_2$ applied during interval $t_2$ may be selected equal to $5\Delta H_0 = 12.5$ gauss, for very good focusing of the magnetic moments, through as pointed out above, intensities $H_2$ greater than $\Delta H_0/2$ will give satisfactory focusing. If $H_1 = H_3 = 20$ gauss, then $t_1 = t_3 = 2.95$ $\mu$ sec. The time $t_2$ may be selected equal to $10^{-3}T_1 = 1000$ $\mu$ sec., which is short compared to $T_1$ and $T_2$.

When field $H_0$ is first applied at time $t=0$, switches 39, 41 and 43 are all opened for a time $T_D$ provided by delay multivibrator 63 to permit the field $H_0$ generated during the first period $T_{G1}$ to reach a constant value. In practice $T_D$ may equal 10 $\mu$ sec. and thus $T_G = 1015.9$ $\mu$ sec. ($=t_D+t_1+t_2+t_3$). At the end of period $t_D$, switch 39 is closed for a period $t_1$ and field $H_1$ produces a 90° ($\theta = \pi/2$) nutation of the macroscopic magnetic moments in sample 55. At the end of period $t_1$ switch 39 is opened and switch 41 is closed for period $t_2$, producing field $H_2$ 90° out of phase with field $H_1$. As explained above, due to the action of field $H_2$ the moments do not fan out during time $t_2$ but are focused by field $H_2$. Accordingly, the moments decay in a time on the order of $T_2$ (one second) rather than on the order of $T_2^*$ which was the case in the past where the field $H_1$ was continuously applied. To see the vast improvement $T_2^*$ is on the order of $1/\gamma \Delta H_0$, and thus in this example $T_2^* \cong 15$ $\mu$ sec. Thus where in the past the resonance signal would decay to a value $1/e$ times its initial value in 15 $\mu$ sec., in accordance with the present invention this decay time is on the order of one second (1,000,000 $\mu$ sec.). Though the time $t_2$ may, if desired, be selected equal to $T_1$ or $T_2$ such that the moment is allowed to decay for one second, preferably the moment is maintained at a higher level, and thus the smaller value of $t_2$ selected above in which the moments do not decay to such a great extent.

At the end of the period $t_2$, switch 41 is opened, and switch 43 is closed to produce field $H_3$ for time $t_3$ which counter rotates the moments back into the $z$ axis, for "repair" in accordance with the principles set forth in my aforementioned copending application Serial No. 463,776. It should be noted that if the period $t_2$ is selected to have a duration on the order of $T_1$ or $T_2$, the period $t_3$ may be dispensed with since there will be very little moment to counter nutate back to the $z$ axis.

At the end of period $t_3$, the switches 39, 41 and 43 are all opened, and the magnetic field along the $z$ axis reduced to value $H_a$. $H_a$ is selected to produce a resonance precession frequency $\omega_a = \gamma H_a$ of the protons in sample 55 substantially different from $\omega_0$ such that any alternating field having frequency $f_0$ will produce substantially no resonance in sample 55. For example $H_a$ may be equal to 200 gauss. Thus during the second interval $T_{G2} = T_{G1}$ substantially no resonance signal is produced during the second periods $t_1$, $t_2$ and $t_3$ occurring during $T_{G2}$. Accordingly, the resonance signal is modulated by coil 57 to appear only during alternate intervals $T_{G1}$, $T_{G3}$, etc., when $H_0$ is applied. However, during intervals $T_{G2}$, $T_{G4}$, etc., when $H_a$ is applied, the fields $H_1$, $H_2$, $H_3$ are nonetheless applied in order that the modulation by the resonance signal may be more easily detected in the output of coil 64. While in this example $H_a$ is less than $H_0$, it will be understood that $H_a$ may be greater if desired. In fact, if $H_a > H_0$, the moments will repair towards a greater magnitude during intervals $T_{G2}$, $T_{G4}$, etc., whereby the resonance signal during intervals $T_{G1}$, $T_{G3}$, etc., will be increased slightly.

If it were physically possible to orient coil 64 at exactly 90° with respect to coil 52, only the resonance signal would appear in coil 64. However, since this is not possible as a practical matter, a large signal at the resonance frequency $f_0$ will be induced in coil 64 by the direct coupling between coils 52 and 64. However, this induced signal will maintain a substantially constant average value over the periods $T_{G1}$, $T_{G2}$, etc., while the resonance signal appears only during alternate periods $T_{G1}$, $T_{G3}$, etc., during cycles ($T_{G1}$, $T_{G2}$), ($T_{G3}$, $T_{G4}$), etc. Accordingly, the resonance signal may be detected by phase sensitive detector 66 after the output of coil 64 has been amplified by amplifier 65 detected by detector 50 and amplified by audio amplifier 50'. Phase sensitive detector 66 is sensitized by a reference signal 83—84 (Fig. 5C) from multivibrator 58 in phase with the modulation of the magnetic field along the $z$ axis through sample 55. During the periods $T_{G1}$, $T_{G3}$, the induced signal plus the resonance signal produce D.C. of one polarity in the output of detector 66, but during the alternate periods $T_{G2}$, $T_{G4}$, etc., only the induced signal (since no resonance signal is present) produces D.C. of the opposite polarity. By averaging the output of detector 66, meter 68 will respond substantially only to the resonance signal (i.e., the induced signal plus the resonance signal during $T_{G1}$ less the induced signal during $T_{G2}$ equals substantially the resonance signal).

However, since the induced signal may be several orders of magnitude larger than the resonance signal, and is of the same frequency, it is desirable to maintain in effect this induced signal at a low level. To this end, balanced phase sensitive detectors 69 and 70 respectively detect any signal in phase (or 180° out of phase), and 90° out of phase (or 270° out of phase), with the oscillator 35 current. Thus the output 75 of detector 69 is a D.C. signal, the magnitude of which is proportional to the intensity of the component of any signal at frequency $f_0$ in the output of amplifier 65, which is in phase or 180° out of phase with the current from oscillator 35, while the polarity of output 75 is dependent on whether this phase is 0° or 180°; the output 77 of detector 70 is a D.C. signal, the magnitude of which is proportional to the intensity of the component of any signal at frequency $f_0$ in the output of amplifier 65, which is 90° or 270° out of phase with the current from oscillator 35, while the polarity of output 65 is dependent on whether this phase is 90° or 270°.

The variable D.C. outputs 75 and 77 of detector 69 and 70, after filtering by low pass filters 75' and 77' to remove any variations at the frequency of the output of multivibrator 58 (i.e., $\frac{1}{2}T_G$), control the gain of push-pull amplifiers 76 and 78 respectively. Amplifier 76 inserts in series with coil 64 a signal in phase with or 180° out of phase with the current from oscillator 35, depending on the polarity of the signal from output 75, while amplifier 78 inserts a signal 90° or 270° out of phase with said current, depending on the polarity of the signal from output 77. The intensities of the outputs depend on the intensity of the D.C. signals from detectors 69 and 70, and the system is arranged for degenerative feedback. Thus any signal at frequency $f_0$ induced in coil 64 from coil 52 is substantially canceled in the output of coil 64. However, due to the filtering provided by devices 75' and 77' which remove variations at the frequency of the modulation of magnetic field provided by means 56, the resonance signal which is modulated at this frequency is not canceled, and may now be more readily detected by detector 66. Thus in the present example, filters 75' and 77' must eliminate any variations in the vicinity of 500 cycles ($\frac{1}{2}T_G$). However, since variations in direct coupling will be slow, devices 75' and 77' may have time constants as long as one second.

Figure 6:
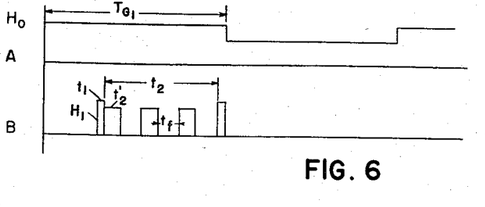
Fig. 6 is another series of pulse diagrams employed to explain additional modifications of the invention.

In another form of operation, it may be desirable to produce the field $H_2$ during the time $t_2$ in the form of discrete pulses, and to measure the resonance signal in the free precession intervals between pulses. Thus, as shown in Fig. 6A, the field along the $z$ axis is modulated as in Fig. 5D, and the $H_1$ pulse of duration $t_1$ applied as before, Fig. 6B. However, during the period $t_2$ the field $H_2$ is applied during pulse periods $t_2'$ with periods $t_f$ between pulses. The times $t_2'$ are each selected equal to $\pi/\gamma H_2$, and $t_f$ must be somewhat less than $\pi/\gamma \Delta H_0$. In the example given above, where $t_2=1000$ μsec. and $\Delta H_0=2.5$ gauss, and $H_2=12.5$ gauss, $t_2'$ may equal 9.4 μsec. and $t_f=10.6$ μsec. whereby $t_2'+t_f=20$ μsec. and there may be thus fifty intervals $t_2'+t_f$ in the 1000 μsec. period $t_2$. The detecting apparatus is activated only during the periods $t_f$, and since no R.F. activation signal is present during periods $t_f$, the detecting apparatus may comprise only a gated amplifier and conventional detector. While $t_2'$ is preferably selected equal to $\pi/\gamma H_2$, values of $t_2'$ less than $\pi/\gamma H_2$ may be employed.

In a second embodiment of the invention the frequency of the current generating the field $H_2$ is selected equal to $f_2=\omega_2/2\pi$, a value appreciably different from the resonance precession frequency $f_0=\omega_0/2\pi$ of the particles in the average intensity of field $H_0$. Thus as in the first embodiment, the field $H_1$ at frequency $f_0$ is applied for a time interval $t_1$ sufficient to nutate the moments substantially 90° into the rotating $x'y'$ plane. At this instant the field $H_1$ is removed, and the field $H_2$ applied as before, except that the frequency $f_2$ of field $H_2$ is substantially different from $f_0$. When the field $H_2$ is applied to a coil which is substantially perpendicular to the coil which produced field $H_1$, the current at frequency $f_2$ generating field $H_2$ must be substantially in phase with the current at frequency $f_0$ which generated field $H_1$; where the field $H_2$ is applied by a coil which is substantially in line with the coil which produced field $H_1$, the current at frequency $f_2$ generating field $H_2$ must be substantially 90° out of phase with the current at frequency $f_0$ which generated field $H_1$. Thus at the instant of application, field $H_2$ is parallel to the moments nutated by field $H_1$.

To understand this phasing where the frequency of field $H_2$ is different from the frequency of field $H_1$, assume that the current of frequency $f_0$ generating field $H_1$ establishes a reference phase which is in phase with said current $f_0$ and which continues after the field $H_1$ is removed. Under these conditions the current at frequency $f_2$ at the instant of application is considered in phase with the current at frequency $f_0$ which produced field $H_1$, if at the instant of application, the current $f_2$ is in phase with said reference phase, e. g. the positive maxima of the first few cycles of $f_2$ correspond substantially to the positive maxima of the reference phase. When a 90° phase relation is desired, these maxima must be displaced 90° in phase. If two coils respectively generating $H_1$ and $H_2$ are not at 90° and are not coincident but are, say, at 45°, obviously this phase relationship would have to be 45°. The test is to have the current which generates $H_2$ of such phase that at the instant of application $H_2$ is parallel to the moments, i. e., perpendicular to the direction which $H_1$ would have assumed at that instant if $H_1$ had not been shut off.

Under these conditions, the moments will lock in at the frequency $f_2$ of field $H_2$, and will be focused to maintain substantial phase coherence.

The magnitudes of the vector components of the moments will be given approximately by relations 8, 9 and 10, except that in this second embodiment $\omega_a=\omega_2$ and the symbols $M_x$, $M_y$ and $M_z$ denote the components of M in a frame of reference rotating at the new angular frequency $\omega_2=2\pi f_2$. Further, in this embodiment the frequency $\omega_2$ is selected such that $|\omega_0-\omega_2|$ is somewhat larger than $\gamma \Delta H_0$; for example, if $|\omega_0-\omega_2|=2\gamma \Delta H_0$ a considerable focusing effect takes place and if $|\omega_0-\omega_2|$ is made larger, the focusing improves. Accordingly, the value of $\delta$ in Relation 6 is relatively constant throughout the sample under investigation, though here again a considerable improvement takes place when $\delta$ varies as little as 50% throughout the sample. As this percentage variation is decreased, by increasing $|\omega_0-\omega_2|$, the focusing improves accordingly. Obviously $\omega_2-\omega_b$ may be either positive or negative but not both, and, therefore, only one of the circles 15 or 16 in Fig. 1G are needed to describe the $M_x$ and $M_z$ components in Relations 8 and 10. This circle corresponds to a value of $\delta$ which is averaged over the entire sample. In addition the magnitude of $H_2$ is selected greater than $|\omega_0-\omega_2|/2\gamma$ but need not be greater than $5|\omega_0-\omega_2|/\gamma$. The resonance is detected at frequency $f_2$ during the interval $t_2$ when field $H_2$ is applied.

Figure 7:
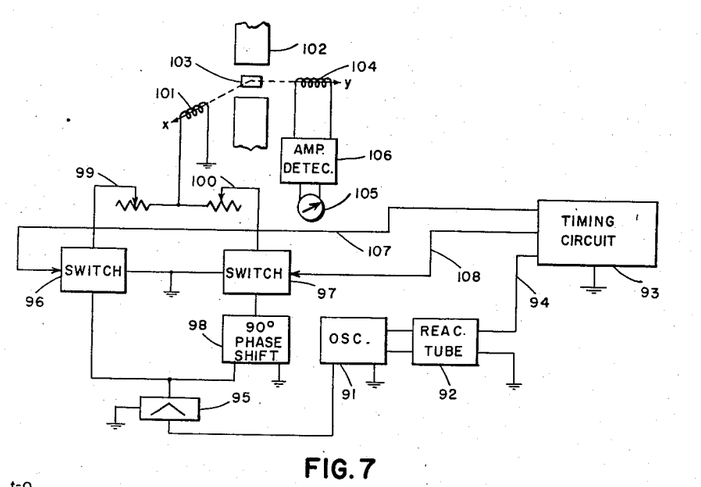
Fig. 7 shows apparatus constructed to operate in accordance with a second embodiment of the invention.
Figure 8:
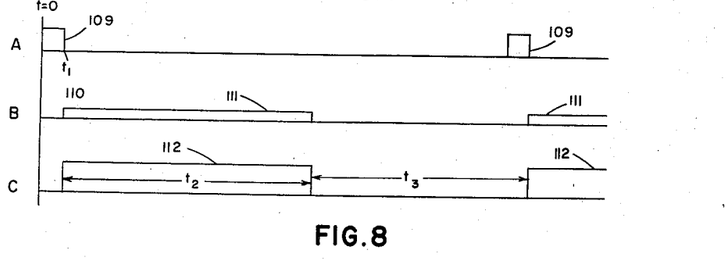
Fig. 8 is a series of pulse diagrams employed to explain the operation of the apparatus shown in Fig. 7.

In Fig. 7 there is shown schematically apparatus in accordance with the above. In Fig. 7, the frequency of the output of an oscillator 91 is adapted to be controlled by a reactance tube 92. The bias on reactance tube 92 may be varied by the potential received from timing circuit 93 via conductor 94. The output of oscillator 91 is amplified by amplifier 95 and applied in parallel to normally opened switch 96, and to normally opened switch 97 via a 90° phase shifter 98. The outputs of switches 96 and 97, when closed, are applied through current control elements 99 and 100, respectively, to R. F. coil 101. Switches 96 and 97 are adapted to be closed by pulses received from timing circuit 93 via conductors 108 and 108 respectively.

Coil 101 has its principal axis at 90° to the constant field of average intensity $H_0$ produced by magnetic means 102 in a sample 103 under investigation. The output of an R. F. detecting coil 104 is indicated on meter 105, after amplification and detection by means 106.

In operation, oscillator 91 normally produces frequency $f_0=\gamma H_0/2\pi$ for the reference bias on reactance tube 92. At time $t=0$, Fig. A, switch 96 is closed by a pulse of duration $t_1$, thus producing a field $H_1$ at frequency $f_0$ in sample 103. As before, $t_1$ is selected to produce a 90° nutation of the macroscopic moments originally aligned with $H_0$. At the end of period $t_1$ the switch 96 is opened and the bias 110 on reactance tube 92 is changed to a new value 111 sufficient to change the frequency of oscillator 91 to $f_2$; in addition, a pulse 112 closes switch 97 and current of the new frequency $f_2$, shifted 90° in phase is applied to coil 101 to produce field $H_2$ at frequency $f_2$ in sample 103. It should be noted that while reactance tube 92 changes the frequency from $f_0$ to $f_2$, initially the phase of $f_2$ will be the same as $f_0$ since the output of oscillator 91 is continuous. Accordingly, as a result of the 90° phase shift provided by means 98, the field $H_2$ will be applied perpendicularly to the direction of field $H_1$ and thus parallel to the moments nutated by field $H_1$. As indicated above, the moments will thus lock in with $H_2$ and the focused thereby. The resonance is detected on meter 105 at frequency $f_2$. The field $H_2$ may be applied for a long period $t_2$, and after a relaxation interval $t^3$, and the process repeated.

Again for proton resonance where $H_0=250$ gauss, $f_0=1.06$ mc. If $\Delta H_0$ is 2.5 gauss, $f_2$ may be selected equal to 1.11 mc. $(|\omega_0-\omega_2|>\gamma H_0)$ and $H_2=22$ gauss$\cong 2(\omega_0-\omega_2)/\gamma$.

It will be understood that in this second embodiment the same detection methods may be employed as in the first embodiment. In addition, of course, the field $H_2$ at frequency $f_2$ may be applied by a coil at right angles to coil 101, in which event phase shifting means 98 is not needed.

Figure 9A:
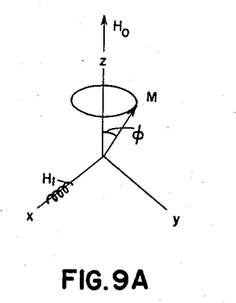
Fig. 9 is a series of vector diagrams employed to explain the principles of a third embodiment of the invention.

In a third embodiment, the present invention may be employed in the steady state condition to good advantage where substantial field inhomogeneities exist. The condition stated in accordance with Relation 2 above and described in connection with Figs. 1A–1D are reasonably accurate in the interval immediately after the application of field $H_1$ at frequency $f_0$ up to times $T_1$ and $T_2$, the relaxation times associated with the resonance. Thereafter, however, in the so-called steady state condition the resonance may be more accurately pictured with reference to Fig. 9. In the stationary frame of reference $x, y, z$ shown in Fig. 9A, the total macroscopic moment M has relaxed to a steady state condition. In the steady state this moment has a constant value M and is precessing about the $z$ axis at the resonance frequency $f_0$, where the field $H_1$ at frequency $f_0$ is applied along the $x$ axis perpendicularly to the field $H_0$ applied along the $z$ axis. In the rotating frame of reference $x'y'z'$, where the field $H_1$ applied is perpendicular to the $y'z'$ plane, the moment M makes a constant angle $\phi$ with the $z'$ axis in the $x'z'$ plane. The angle $\phi$ is determined approximately by the relative intensities of $H_0$ and $H_1$.

In accordance with this third embodiment, after the moments are aligned along the $z$ axis, the field $H_1$ at the resonance precession frequency $f_0$ for the average intensity of the constant field $H_0$ is applied perpendicularly to $H_0$ for a period $t_1$ of sufficient duration to nutate the moments through the angle $\phi$, where $\phi$ is the steady state angle which the moments would have eventually assumed in an alternating field of intensity $H_2$. The time $t_1$ is computed in accordance with Relation 2 above. The application of field $H_1$ for period $t_1$ very quickly nutates the moments into the steady state angle $\phi$ in a time very short compared to the usual times $T_1$ or $T_2$ taken for this transition. At the end of period $t_1$ the field $H_1$ is removed, and field $H_2$ applied perpendicularly to $H_0$ and at a frequency $f_2$ substantially different from $f_0$.

The phasing of field $H_2$ is selected as in the selection of the phase of the field $H_2$ at frequency $f_2$ in the second embodiment above, except that $H_2$ is parallel to that component of the moment M which is parallel to the $xy$ plane, since M is not perpendicular to the $z$ axis in this embodiment. This field $H_2$ is applied parallel to the $y'$ axis in Fig. 9B.

The resonance may be observed continuously after interval $t_1$ at frequency $f_2$ by induction or dispersion. In this third embodiment the intensity $H_2$ is selected greater than $\Delta H_0$ by at least 2, but preferably $H_2$ equals at least $5\Delta H_0$. The optimum frequency $f_2$ to be employed is given by $$f_2 = \gamma \left( H_0 \pm H_2 \left(\frac{T_1}{T_2}\right)^{1/2} \right) / 2\pi \quad (11)$$

where $T_1$ and $T_2$ are the relaxation times and $H_0$ is the average value of the constant field throughout the sample under investigation.

It can be shown that where $1/\gamma H_2 T_1$ and $1/\gamma H_2 T_2$ are approximately equal and are substantially less than one, $$\phi = \tan^{-1}\left(\frac{T_2}{T_1}\right)^{1/2}$$

Figure 9B:
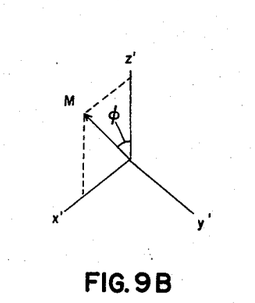

In the case for proton resonance where $T_2 \cong T_1 \cong$ one second, these relations are easily obtained, and thus $\phi \cong 45°$. In addition, where the conditions are as above.

$$M_x \cong \frac{\delta}{\delta^2 + T_1/T_2} M_0 \quad (12)$$

where $M_x$ is the component of M in Fig. 9B along the $x'$ axis, $M_0$ is the magnitude of the total moment in field $H_0$ prior to application of $H_1$ and $H_2$ and $$\delta = \frac{\gamma H_0 - \omega_2}{\gamma H_2} \quad (13)$$

Thus the maximum value of $M_x$ (i. e., the detectable resonance signal) occurs in Relation 11 when $$\delta = (T_1/T_2)^{1/2}$$

By selecting values $H_2$ and $\omega_2$ as indicated above, $\delta$ may be made substantially equal to $(T_1/T_2)^{1/2}$ throughout the volume in which event $$M_x = \tfrac{1}{2}\left(\frac{T_2}{T_1}\right)^{1/2} M_0 \quad (12)$$

For proton resonance this steady state component $M_x$ is equal to one-half the total moment which was initially present, since $T_1 \cong T_2$. Accordingly, by the present focusing method a relatively large signal may be detected in the presence of substantial field inhomogeneities, even in the steady state method.

In any of the above embodiments, if the value of the field $H_0$ is known, the present invention may be employed for chemical analysis of unknown samples. The invention finds particular utility in commercial applications where a high degree of field homogeneity may not be practical, for example in well logging techniques as disclosed, for example, in my copending application Serial No. 330,978, filed January 13, 1953, for "Analysis of Substances by the Measurement of Nuclear Magnetic Relaxation Times," or in copending application Serial No. 414,379, filed March 5, 1954, by H. F. Schwede for "Nuclear Resonance Well Logging Method and Apparatus."

While in the aforementioned embodiments, the detected signal is generally measured directly as an indication of the intensity of the resonance signal, this detected signal may be used in many other ways. For example, during the interval $t_2$ in the first embodiment above where the frequency of field $H_2 = \omega_0$, the detected signal is decaying directly as a function of the relaxation time $T_2$. Accordingly this rate of decay may be measured to determine the relaxation time $T_2$ of the particular material under investigation. To this end, in Fig. 4, the signal measured during the first half of each period $t_2$ may be compared to the signal measured during the second half of period $t_2$, thus giving an indication of $T_2$. Such measurements are useful for example in distinguishing different chemical compounds containing the same paramagnetic particles, since the relaxation times $T_2$ may be different even though the resonance precession frequencies are substantially the same.

It will be understood that many different apparatus may be employed within the spirit of the invention, and that the specific examples of magnetic field strengths and frequency are merely representative. Thus the appended claims are not limited by the specific embodiments and examples herein disclosed.

I claim:

1. Apparatus for obtaining an electrical signal representative of paramagnetic resonance phenomena comprising: means for applying a unidirectional magnetic field through a sample to be investigated; coil means disposed to produce an alternating magnetic field in said sample substantially perpendicularly to said unidirectional field when alternating current is passed through said coil means; means for applying a first alternating current through said coil means during a first time interval, the frequency of said first alternating current being substantially equal to the resonance precession frequency of a particular class of paramagnetic particles at the average intensity of said unidirectional field in said sample, whereby said coil means produces a first alternating magnetic field in said sample substantially perpendicular to said unidirectional field and having a reference phase; means for applying a second alternating current to said coil means during a second time interval immediately following said first time interval, whereby said coil means produces a second alternating magnetic field in said sample during said second time interval, said second alternating current at the beginning of said second time interval being phased to produce a substantially 90° phase difference between the phases of said second alternating magnetic field and said reference phase at the beginning of said second time interval; and means for detecting magnetic resonance in said sample during said second time interval at the frequency of said second alternating current.

2. Apparatus for obtaining an electrical signal representative of paramagnetic resonance phenomena comprising: means for applying a unidirectional magnetic field through a sample to be investigated; a coil disposed to produce an alternating magnetic field in said sample substantially perpendicularly to said unidirectional field when alternating current is passed through said coil; means for applying a first alternating current through said coil during a first time interval, the frequency of said first alternating current being substantially equal to the resonance precession frequency of a particular class of paramagnetic particles at the average intensity of said unidirectional field in said sample, and the phase of said first alternating current establishing a reference phase, whereby said coil produces a first alternating magnetic field in said sample substantially perpendicular to said unidirectional field; means for applying a second alternating current to said coil during a second time interval immediately following said first time interval, whereby said coil produces a second alternating magnetic field in said sample during said second time interval, said second alternating current at the beginning of said second time interval being substantially 90° out of phase with said reference phase; and means for detecting magnetic resonance in said sample during said second time interval at the frequency of said second alternating current.

3. Apparatus for obtaining an electrical signal representative of paramagnetic resonance phenomena comprising: means for applying a unidirectional magnetic field through a sample to be investigated; a first coil disposed to produce an alternating magnetic field in said sample substantially perpendicularly to said unidirectional field when alternating current is passed through said first coil; a second coil disposed perpendicularly to said first coil and adapted to produce an alternating magnetic field in said sample substantially perpendicularly to said unidirectional field when alternating current is passed through said second coil; means for applying a first alternating current through said first coil during a first time interval, the frequency of said first alternating current being substantially equal to the resonance precession frequency of a particular class of paramagnetic particles at the average intensity of said unidirectional field in said sample, and the phase of said first alternating current establishing a reference phase, whereby said first coil produces a first alternating magnetic field in said sample substantially perpendicular to said unidirectional field; means for applying a second alternating current to said second coil during a second time interval immediately following said first time interval, whereby said second coil produces a second alternating magnetic field in said sample during said second time interval, said second alternating current at the beginning of said second time interval being substantially in phase with said reference phase; and means for detecting magnetic resonance in said sample during said second time interval at the frequency of said second alternating current.

4. Apparatus for obtaining an electrical signal representative of paramagnetic resonance phenomena comprising: means for applying a unidirectional magnetic field through a sample to be investigated; coil means disposed to produce an alternating magnetic field in said sample substantially perpendicularly to said unidirectional field when alternating current is passed through said coil means; means for applying a first alternating current through said coil means during a first time interval, the frequency of said first alternating current being substantially equal to the resonance precession frequency of a particular class of paramagnetic particles at the average intensity of said unidirectional field in said sample, whereby said coil means produces a first alternating magnetic field in said sample substantially perpendicular to said unidirectional field and having a reference phase; means for applying a second alternating current of substantially the same frequency as said first alternating current to said coil means during a second time interval immediately following said first time interval, whereby said coil means produces a second alternating magnetic field in said sample during said second time interval, said second alternating current at the beginning of said second time intreval being phased to produce a substantially 90° phase difference between the phases of said second alternating magnetic field and said reference phase at the beginning of said second time interval; and means for detecting magnetic resonance in said sample during said second time interval at said resonance precession frequency.

5. Apparatus for obtaining an electrical signal representative of paramagnetic resonance phenomena comprising: means for applying a unidirectional magnetic field through a sample to be investigated; coil means disposed to produce an alternating magnetic field in said sample substantially perpendicularly to said unidirectional field when alternating current is passed through said coil means; means for applying a first alternating current through said coil means during a first time interval, the frequency of said first alternating current being substantially equal to the resonance precession frequency of a particular class of paramagnetic particles at the average intensity of said unidirectional field in said sample, whereby said coil means produces a first alternating magnetic field in said sample substantially perpendicular to said unidirectional field and having a reference phase; means for applying a second alternating current of a frequency substantially different from said resonance precession frequency to said coil means during a second time interval immediately following said first time interval, whereby said coil means produces a second alternating magnetic field in said sample during said second time interval, said second alternating current at the beginning of said second time interval being phased to produce a substantially 90° phase difference between the phases of said second alternating magnetic field and said reference phase at the beginning of said second time interval; and means for detecting magnetic resonance in said sample during said second time interval at the frequency of said second alternating current.

6. Apparatus for obtaining an electrical signal representative of paramagnetic resonance phenomena resulting from paramagnetic particles having a gyromagnetic ratio $\gamma$, comprising: means for applying a unidirectional magnetic field through a sample to be investigated; means for modulating said unidirectional field to have alternately a first intensity during first time intervals and a second intensity during second time intervals of duration substantially equal to said first time intervals; coil means disposed to produce an alternating magnetic field in said sample substantially perpendicular to said unidirectional field when alternating current is passed through said coil means; means for applying a first alternating current through said coil means during first time periods recurring during each first and second time intervals, the frequency of said first alternating current being substantially equal to the resonance precession frequency of said paramagnetic particles at the average intensity of said unidirectional field in said sample during said first time intervals, whereby said coil means produces during said first time periods a first alternating magnetic field of effective intensity $H_1$ in said sample substantially perpendicular to said unidirectional field and having a reference phase, said first time periods being of durations substantially equal to $\pi/2\gamma H_1$; means for applying a second alternating current to said coil means during second time periods immediately following said first time periods during each first and second time intervals, whereby said coil means produces a second alternating magnetic field in said sample during said second time periods, said second alternating current at the beginning of said second time periods being phased to produce a substantially 90° phase difference between the phases of said second alternating magnetic field and said reference phase at the beginning of said second time period; and means synchronized with said modulating means for detecting magnetic resonance in said sample at the frequency of said second alternating current.

7. Apparatus for obtaining an electrical signal representative of paramagnetic resonance phenomena resulting from paramagnetic particles having a gyromagnetic ratio $\gamma$ comprising: means for applying a unidirectional magnetic field through a sample to be investigated, coil means disposed to produce an alternating magnetic field in said sample substantially perpendicularly to said unidirectional field when alternating current is passed through said coil means; means for applying a first alternating current to said coil means during a first time interval, the frequency of said alternating current being substantially equal to the resonance precession frequency of said paramagnetic particles at the average intensity of said unidirectional field in said sample, whereby said coil means produces during said first time interval a first alternating magnetic field of effective intensity $H_1$ in said sample substantially perpendicular to said unidirectional field and having a reference phase, said first time interval being of duration substantially equal to $\pi/2\gamma H_1$; means for periodically applying a second alternating current to said coil means during a second time interval immediately following said first time interval, whereby said coil means periodically produces a second alternating magnetic field of effective intensity $H_2$ in said sample during said second time interval, said second alternating current being applied for first periods substantially equal to $\pi/\gamma H_2$ during said second time intervals, with second periods shorter than $\pi/\gamma \Delta H_0$ between said first periods, where $\Delta H_0$ is the half-width of the inhomogeneity in the unidirectional field through said particles, said second alternating current at the beginning of said second time interval being phased to produce a substantially 90° phase difference between the phases of said second alternating magnetic field and said reference phase at the beginning of said second time interval; and means for detecting magnetic resonance in said sample during said second periods at the frequency of said second alternating current.

8. Apparatus for obtaining an electrical signal representative of paramagnetic resonance phenomena resulting from a particular class of paramagnetic particles having a gyromagnetic ratio $\gamma$ comprising: means for applying a unidirectional magnetic field through a sample to be investigated, coil means disposed to produce an alternating magnetic field in said sample substantially perpendicularly to said unidirectional field when alternating current is passed through said coil means; means for applying a first alternating current through said coil means during a first time interval, the frequency of said first alternating current being substantially equal to the resonance precession frequency of said paramagnetic particles at the average intensity of said unidirectional field in said sample, whereby said coil means produces during said first time interval a first alternating magnetic field of effective intensity $H_1$ in said sample substantially perpendicular to said unidirectional field and having a reference phase, said first time interval being of duration substantially equal to $\pi/2\gamma H_1$; means for periodically applying a second alternating current to said coil means during a second time interval immediately following said first time interval, whereby said coil means periodically produces a second alternating magnetic field of effective intensity $H_2$ in said sample during said second time interval, said second alternating current being applied for first periods substantially equal to $\pi/\gamma H_2$ during said second time interval, with second periods of uniform short duration between said first periods, said second alternating current at the beginning of said second time interval being phased to produce a substantially 90° phase difference between the phases of said second alternating magnetic field and said reference phase at the beginning of said second time interval; and means for detecting magnetic resonance in said sample during said second time interval at the frequency of said second alternating current.

9. Apparatus for obtaining an electrical signal representative of paramagnetic resonance phenomena resulting from a particular class of paramagnetic particles having a gyromagnetic ratio $\gamma$ comprising: means for applying a unidirectional magnetic field through a sample to be investigated, coil means disposed to produce an alternating magnetic field in said sample substantially perpendicularly to said unidirectional field when alternating current is passed through said coil means; means for applying a first alternating current through said coil means during a first time interval, the frequency of said first alternating current being substantially equal to the resonance precession frequency of said paramagnetic particles at the average intensity of said unidirectional field in said sample, whereby said coil means produces during said first time interval a first alternating magnetic field of effective intensity $H_1$ in said sample substantially perpendicular to said unidirectional field and having a reference phase, said first time interval being of duration substantially equal to $\pi/2\gamma H_1$; means for periodically applying a second alternating current to said coil means during a second time interval immediately following said first time interval, whereby said coil means periodically produces a second alternating magnetic field of effective intensity $H_2$ in said sample during said second time interval, said second alternating current being applied for first periods substantially equal to $\pi/\gamma H_2$ during said second time interval, with second periods of uniform short duration between said first periods, said second alternating current having a frequency equal to the frequency of said first alternating current and being phased to produce a substantially 90° phase difference between the phases of said second alternating magnetic field and said reference phase throughout said second time interval; and means for detecting magnetic resonance in said sample during said second time interval at the frequency of said second alternating current.

References Cited in the file of this patent

Torrey: Physical Review, vol. 76, No. 8, Oct. 15, 1949, pp. 1059–1066.

Hahn: Physical Review, vol. 80, No. 4, Nov. 15, 1950, pp. 580–593.

UNITED STATES PATENT OFFICE

Certificate of Correction

Patent No. 2,878,443                                      March 17, 1959

Nick A. Schuster

It is hereby certified that error appears in the printed specification of the above numbered patent requiring correction and that the said Letters Patent should read as corrected below.

Column 3, lines 69 and 70, for "phenomina" read —phenomena—; column 7, line 29, for "phases" read —phased—; column 11, line 28, for "to a coil" read —by a coil—; column 12, line 26, for "108", first occurrence, read —107—; line 52, for "the focused" read —be focused—; line 57, for "$(|\omega_0-\omega_2|>\gamma H_0)$" read —$(|\omega_0-\omega_2|>\gamma \Delta H_0)$—.

Signed and sealed this 4th day of August 1959.

[SEAL]

Attest:
KARL H. AXLINE,
*Attesting Officer.*

ROBERT C. WATSON,
*Commissioner of Patents.*